July 16, 1963 H. LUDWIG 3,097,396
INJECTION MOLDING MACHINE FOR PLASTICS
Filed Oct. 20, 1961
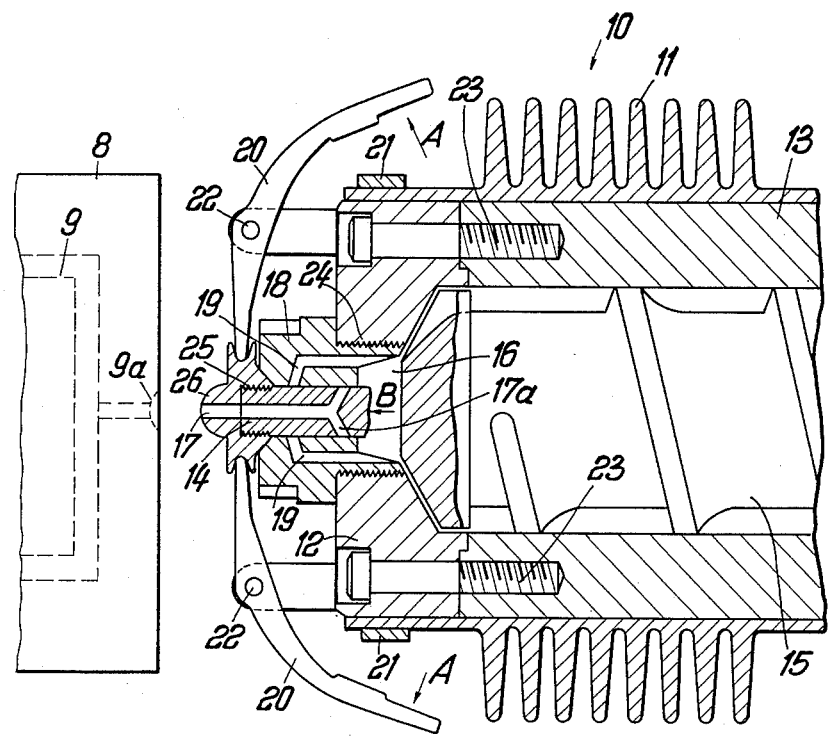
Inventor:
Herbert Ludwig
by: Michael S. Striker
Attorney 3,097,396
INJECTION MOLDING MACHINE FOR PLASTICS
Herbert Ludwig, Desmastrasse 112, Uesen,
near Bremen, Germany
Filed Oct. 20, 1961, Ser. No. 146,564
Claims priority, application Germany Oct. 29, 1960
4 Claims. (Cl. 18—30)

The present invention relates to improvements in an injection molding machine for plastics which generally consists of at least one mold support carrying at least one mold, and an extruder head with a movable injection nozzle projecting from the extruder head.

The conventional injection molding machines of the above-mentioned type operate in two different manners in order to connect the injection nozzle with the mold and with the sprue opening thereof.

In the first kind of these machines, the mold support together with the mold is moved toward the injection nozzle, or several such mold supports may be provided and mounted, for example, on a turntable and be moved in a timed succession toward the injection nozzle and the mold support then pushes the injection nozzle for a few centimeters into the extruder head in order to connect the nozzle channels with the inside of the extruder head and at the same time to connect the nozzle head with the sprue opening of the mold.

These injection molding machines have the disadvantage that in their operation considerable weights have to be moved and then again stopped which requires a considerable amount of energy and renders the operation very expensive. Because of the heavy weight the wear on the movable parts of the machine is also considerable and the operating speed of the machine cannot be increased as much as may be desired since it would then be almost impossible to control the large inertia forces which would then occur.

In the second kind of the known injection molding machines the entire extruder head together with the screw and the injection nozzle is moved toward and against the mold support, for example, by means of a hydraulic cylinder, in such a manner that the injection nozzle engages with the sprue opening of the mold and is then inserted for a few centimeters into the sprue opening when the extruder head is further advanced.

Although the weight to be moved in this type of machine is lower than in that of the first type as mentioned above, the drive of the screw which must be also reciprocating is more complicated than that of the screw in the stationary extruder head of the first type.

It is an object of the present invention to improve the conventional types of injection molding machines so as to overcome the aforementioned disadvantages.

The present invention consists in providing an injection molding machine in which, independently of the mold support and mold which are locked in a fixed position for the injection and also independently of the nozzle head, the injection nozzle is movable within the extrusion head and toward and against the sprue opening of the mold while at the same time and by the same movement, the nozzle channels are opened toward the inside at the extrusion head to start the injection of the plastic into the mold.

The invention attains the considerable advantage over the injection molding machines of previous designs that for moving the injection nozzle and the sprue opening of the mold toward and into engagement with each other, it is only necessary to move the injection nozzle, while the mold support and the mold as well as the extruder head remain stationary. Therefore, it is not necessary as in the conventional types of machines to move any large bodies of a considerable weight in order to carry out the injection operation. Since the reciprocating movement of the small injection nozzle requires very little effort, the entire operation of the machine is much easier and less expensive.

The machine according to the invention has the further very important advantage that the extruder head remains stationary which permits the screw to be driven in a very simple manner.

Still another novel and very advantageous feature of the new machine is that the injection nozzle may be moved to the inoperative position by simple means, for example, by one or more pivotable levers, which act upon the head of the injection nozzle which projects from the nozzle housing, and that suitable stop members are provided to prevent these means from being moved too far so that the forward movement of the injection nozzle beyond a certain point will be prevented.

The above-mentioned objects, features, and advantages of the present invention will become more clearly apparent from the following detailed description thereof which is to be read with reference to the accompanying drawing which shows a side view, partly in section of one preferred embodiment of the invention.

The injection molding machine according to the invention generally comprises a mold support 8 carrying the mold 9 which has a sprue opening 9a, and an extruder head 10. This extruder head consists of a cylinder 13 with a cover 12 which is secured to the cylinder by bolts 23. Cylinder 13 of the extruder head has cooling ribs 11 and contains a worm 15 for feeding the material which first passes into a chamber 16. A nozzle housing 18 in which an injection nozzle 14 is slidably mounted is screwed by means of a thread 24 into the cover 12 of the extruder head. Nozzle 14 contains nozzle channels 17 and 17a which are associated with channels 19 in the nozzle housing 18, and it carries on its front end a head 26 which may, for example, be screwed thereon by a thread 25 and projects from the nozzle housing 18. The rear end of nozzle 14 projects into chamber 16. When nozzle 14 is retracted to the position as illustrated in the drawing, no material can enter into the nozzle channels 17, 17a and only when nozzle 14 is moved forwardly to the injecting position in which it projects from the nozzle housing 18, will the nozzle channels 17a be in alignment and communication with channels 19 so that the material can enter into channels 17 and 17a.

For retracting the injection nozzle 14 suitable means are provided which, as shown in the drawing, may consist, for example, of two-armed levers 20 which are pivotable about the axes 22. The inner ends of these levers 20 engage into a recess or recesses in the nozzle head 26 which projects from the nozzle housing 18. If a force is exerted upon levers 20 in the direction of the arrows A, nozzle 14 will be pushed back into nozzle housing 18 against the pressure of the material in the forward direction, as indicated by the arrow B, so that no material can be injected into channels 17, 17a. As soon as levers 20 are released, however, nozzle 14 will be pushed forwardly by the pressure of the material in the extruder head in the direction of arrow B until nozzle head 26 engages with the sprue opening 9a of mold 9. In order to prevent nozzle 14 from being moved too far forwardly, the extruder head 10 is provided with stop members 21 against which levers 20 will then engage.

The operation of the machine is as follows:

If only one mold support 8 and one extruder head 10 are provided, they are mounted in a stationary position at the required distance from each other. If, however, one extruder head 10 is associated with several mold supports 8 which are mounted, for example, on a turntable, not shown, and are moved in a timed succession relative to the extruder head 10, the respective mold support 8 is at first moved to the injecting position opposite to the extruder head by turning the turntable, whereupon it is locked in this position. Mold support 8 is then spaced at a predetermined distance from the stationary extruder head 10, as illustrated in the drawing, and the injection nozzle 14 is in the retracted position in which a force is exerted upon levers 20 in the direction of arrows A, for example, by hand or by a pressure cylinder or similar means. Nozzle channels 17, 17a in the injection nozzle 14 are then shut off from channels 19 in the nozzle housing 18 so that no material can be ejected from the nozzle.

For carrying out an injection, the force upon levers 20 in the direction of arrows A is released, whereupon the pressure of the plastic material in the direction of arrow B pushes nozzle 14 forwardly and out of the nozzle housing 18 until the nozzle head 26 engages with the surface of sprue opening 9a of mold 9. In this injecting position, nozzle channels 17a communicate with channels 19 so that the injection will take place. Nozzle 14 may also be moved by different means than by the levers 20, for example, by a bell crank, keys, or the like.

The machine according to the invention may be employed not only for the injection of plastics but also of other materials, for example, rubber.

Although my invention has been illustrated and described with reference to the preferred embodiment thereof, I wish to have it understood that it is in no way limited to the details of such embodiment, but is capable of numerous modifications within the scope of the appended claims.

Having thus fully disclosed my invention, what I claim is:

1. An injection molding machine comprising, in combination, a mold formed with a sprue opening at one side thereof;
   a cylinder closed at one end facing said side of said mold and being formed in said closed end with a bore therethrough, said mold and said cylinder being stationarily arranged spaced from each other;
   a nozzle having a closed rear end facing the interior of said cylinder and being slidably arranged in said bore movable between a rear inactive position and a forward injection position;
   first passage means formed in said nozzle and having a front portion aligned with said sprue opening and a rear portion ending forwardly of said closed rear end of said nozzle at the annular surface defining said bore;
   second passage means formed in said closed end of said cylinder and having a rear portion communicating with the interior of said cylinder and a front portion ending at said surface, said front portion of said second passage means being out of alignment with said rear portion of said first passage means when said nozzle is in said rear inactive position and said front portion of said second passage means being aligned and in communication with said rear portion of said first passage means when said nozzle is in said forward injection position;
   and means in the interior of said cylinder for pressing plastic material against said closed end of said cylinder and said closed rear end of said nozzle for moving the latter from said inactive to said forward injection position, whereby said first and second passage means are brought in communication with each other so that plastic material will flow from the interior of said cylinder through said second and first passage means into said sprue opening of said mold.

2. An injection molding machine comprising, in combination, a mold formed with a sprue opening at one side thereof;
   a cylinder closed at one end facing said side of said mold and being formed in said closed end with a bore therethrough, said mold and said cylinder being stationarily arranged spaced from each other;
   a nozzle having a closed rear end facing the interior of said cylinder and being slidably arranged in said bore movable between a rear inactive position and a forward injection position;
   first passage means formed in said nozzle and having a front portion aligned with said sprue opening and a rear portion ending forwardly of said closed rear end of said nozzle at the annular surface defining said bore;
   second passage means formed in said closed end of said cylinder and having a rear portion communicating with the interior of said cylinder and a front portion ending at said surface, said front portion of said second passage means being out of alignment with said rear portion of said first passage means when said nozzle is in said rear inactive position and said front portion of said second passage means being aligned and in communication with said rear portion of said first passage means when said nozzle is in said forward injection position;
   means in the interior of said cylinder for pressing plastic material against said closed end of said cylinder and said closed rear end of said nozzle for moving the latter from said inactive to said forward injection position, whereby said first and second passage means are brought in communication with each other so that plastic material will flow from the interior of said cylinder through said second and first passage means into said sprue opening of said mold;
   and retracting means operatively connected to said nozzle for retracting the same from said forward injection position to said rear inactive position.

3. An injection molding machine comprising, in combination, a mold formed with a sprue opening at one side thereof;
   a cylinder closed at one end facing said side of said mold and being formed in said closed end with a bore therethrough, said mold and said cylinder being stationarily arranged spaced from each other;
   a nozzle having a closed rear end facing the interior of said cylinder and being slidably arranged in said bore movable between a rear inactive position and a forward injection position;
   first passage means formed in said nozzle and having a front portion aligned with said sprue opening and a rear portion ending forwardly of said closed rear end of said nozzle at the annular surface defining said bore;
   second passage means formed in said closed end of said cylinder and having a rear portion communicating with the interior of said cylinder and a front portion ending at said surface, said front portion of said second passage means being out of alignment with said rear portion of said first passage means when said nozzle is in said rear inactive position and said front portion of said second passage means being aligned and in communication with said rear portion of said first passage means when said nozzle is in said forward injection position;
   means in the interior of said cylinder for pressing plastic material against said closed end of said cylinder and said closed rear end of said nozzle for moving the latter from said inactive to said forward injection position, whereby said first and second passage means are brought in communication with each other so that plastic material will flow from the interior of said cylinder through said second and first passage means into said sprue opening of said mold;
   retracting means operatively connected to said nozzle for retracting the same from said forward injection position to said rear inactive position;

and stop means for engaging said retracting means during forward movement of said nozzle to limit the extent of said forward movement.

4. An injection molding machine comprising, in combination, a mold formed with a sprue opening at one side thereof;

a cylinder closed at one end facing said side of said mold, said mold and said cylinder being stationarily arranged spaced from each other;

a nozzle housing arranged in said closed end of said cylinder and being formed with a bore therethrough communicating with the interior of said cylinder;

a nozzle having a closed rear end facing the interior of said cylinder and being slidably arranged in said bore movable between a rear inactive position and a forward injection position;

first passage means formed in said nozzle and having a front portion aligned with said sprue opening and a rear portion ending forwardly of said closed rear end of said nozzle at the annular surface defining said bore;

second passage means formed in said nozzle housing and having a rear portion communicating with the interior of said cylinder and a front portion ending at said surface, said front portion of said second passage means being out of alignment and forwardly spaced from said rear portion of the first passage means when said nozzle is in said rear inactive position and said front portion of said second passage means being aligned and communicates with said rear portion of said first passage means when said nozzle is in said forward injection position;

extrusion screw means in the interior of said cylinder for pressing plastic material against the closed end of the cylinder and said closed rear end of said nozzle for moving the latter from said rear inactive position to said forward injection position;

retracting means operatively connected to said nozzle for retracting the same from said forward injection position to said rear inactive position;

and stop means fixed to said cylinder for engaging said retracting means during forward movement of said nozzle to limit the extent of said forward movement.

References Cited in the file of this patent

UNITED STATES PATENTS

| | | |
|---|---|---|
| 2,344,176 | Shaw | Mar. 14, 1944 |
| 2,359,840 | Goessling | Oct. 10, 1944 |
| 2,431,843 | Swoger | Dec. 2, 1947 |
| 2,811,744 | Baldanza | Nov. 5, 1957 |
| 2,855,734 | Wucher | May 12, 1959 |

FOREIGN PATENTS

| | | |
|---|---|---|
| 569,155 | Great Britain | May 10, 1945 |
| 1,172,986 | France | Oct. 20, 1958 |